UNITED STATES PATENT OFFICE.

HARRY A. HOFFMAN, OF AKRON, OHIO, ASSIGNOR TO THE B. F. GOODRICH COMPANY, OF NEW YORK, N. Y., A CORPORATION OF NEW YORK.

METHOD OF TREATING GOLF BALLS.

1,405,845.  Specification of Letters Patent.  Patented Feb. 7, 1922.

No Drawing.  Application filed June 22, 1921. Serial No. 479,685.

*To all whom it may concern:*

Be it known that I, HARRY A. HOFFMAN, a citizen of the United States, residing at Akron, in the county of Summit and State of Ohio, have invented a certain new and useful Method of Treating Golf Balls, of which the following is a specification.

This invention relates to the manufacture of golf balls having a cover composed of a vulcanizable substance, and it relates more particularly to steps in the manufacture preceding and related to the application of the coating of varnish or paint on the outside of the ball.

As a means for obtaining an unusually tough but flexible cover, it has been proposed to apply to the ordinary center composed of a core and tense windings of rubber tape or thread, shaped sections of cover-stock composed largely of balata or gutta-percha, or both, together with a small percentage of rubber, and to vulcanize on the ball a cover composed of this stock containing an admixture of small quantities of sulfur and a rapid accelerator of vulcanization such, for example, as zinc-ethyl-xanthogenate. This accelerator of the dithio-carbonic acid series, and others, possess the property of inducing vulcanization at temperatures in the neighborhood of 220° F., thus avoiding any harmful effect on the tense rubber windings when applied for a comparatively brief period.

The use of a rapid accelerator under those conditions makes it possible to mold and partially vulcanize or set the cover during a comparatively brief period of application of the molding pressure and heat, say about 6 minutes, then to remove the balls from the molds and allow them to age for several days at ordinary temperature, during which the vulcanization proceeds and becomes complete. The short time in the mold increases the capacity of the molding equipment. In the practice of that method, however, difficulty has been experienced in securing a sufficiently rapid drying of the coatings of varnish or paint which are applied as a finish to the covered balls, and it is a primary object of my present invention to overcome that difficulty.

In the preferred mode of practicing the invention, I take a golf ball having a partially vulcanized cover composed, for example, of the above-mentioned ingredients, and immerse it for a period of not exceeding 45 seconds, (preferably from 10 to 20 seconds) in a highly dilute solution of sulphur chloride in a neutral liquid vehicle such as benzol, thereby effecting a so-called "acid cure" or cold vulcanization of the outer surface of the cover. A 1% solution of sulphur chloride has been successfully used. The ball is then removed from the dipping solution and allowed to dry by evaporation of the benzol. It is then painted with the usual finishing coats, which may be, for example, an inner coating of ordinary varnish followed by several successive coats of white paint. If the dipping in the sulfur chloride solution takes place either at once upon removal of the partially cured balls from the molds or within a period not longer than about 48 hours thereafter, it is found that the successive coats of varnish or paint will each dry over night (16 to 18 hours). If a substantially longer time is allowed to elapse between the molding and the dipping, such as 6 days, the drying of the coatings occurs more slowly. The rate of drying is further affected by the proportions of sulfur and accelerator used, a decrease in the amount of sulfur accompanied with an increased amount of accelerator having the effect of retarding the rate of drying. The time and temperature employed in the molding operation will also influence the rate of drying, the rate being accelerated by a longer period of curing of the cover in the heated mold, and vice versa. The following composition has given good results, the parts being by weight:

| | |
|---|---|
| Balata | 90 |
| Rubber | 10 |
| Zinc oxide | 10 |
| Sulphur | 2 |
| Zinc-ethyl xanthogenate | 3 | but the ingredients and the proportions are subject to some variation.

As a substitute for the sulfur chloride dip I may immerse the balls in boiling water for about 15 minutes, especially if the accelerator used in the cover stock is one which will induce rapid vulcanization at a temperature under 212° F., and I may also modify the mode of procedure in various other ways without departing from the scope of my invention.

I claim:

1. The method of making golf balls which comprises partially curing a vulcanizable cover stock on the ball under heat and pressure in a mold, removing the ball from the mold, further curing the cover by applying a vulcanizing fluid thereto within a relatively short period after removal from the mold, and then painting the ball.

2. The method of making golf balls which comprises curing a vulcanizable cover stock upon the ball in a heated mold, removing the ball from the mold, acid-curing the surface thereof, and painting said surface.

3. The method of making golf balls which comprises applying to the ball a cover stock composed largely of a substance of the nature of balata compounded with vulcanizing material, removing the ball from the mold, further curing the cover by the application of a vulcanizing fluid, and then painting the cover.

4. The method of making golf balls which comprises applying to the ball a cover stock composed largely of a substance of the nature of balata compounded with vulcanizing material, dipping the ball in a highly-dilute acid-curing solution, and then painting it.

5. The method of making golf balls which comprises applying to the ball a cover stock composed of a vulcanizable substance compounded with sulfur and an accelerator of vulcanization, partially vulcanizing the cover with heat and pressure in a mold, further vulcanizing the outer surface only of the cover and then painting the cover.

6. The method of making golf balls which comprises applying to the ball a vulcanizable cover which will cure quickly under heat and will further set by aging at ordinary temperature, partially curing the cover on the ball in a heated mold, removing the ball from the mold before vulcanization is complete, dipping it in a highly dilute solution of sulfur chloride in benzol, and painting the ball.

7. The method of making golf balls which comprises applying to the ball a vulcanizable cover containing an accelerator of vulcanization, partially curing the cover on the ball in a heated mold, removing the ball from the mold, dipping it within a relatively short time thereafter in a solution containing approximately 1% of a cold-vulcanizing agent for a period not exceeding 45 seconds, and then painting the cover.

In witness whereof I have hereunto set my hand this 16th day of June, 1921.

HARRY A. HOFFMAN.